United States Patent
Tang et al.

(10) Patent No.: US 6,313,917 B1
(45) Date of Patent: Nov. 6, 2001

(54) PRODUCE DATA COLLECTOR AND PRODUCE RECOGNITION SYSTEM

(75) Inventors: Hong Tang; Yeming Gu, both of Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/346,716

(22) Filed: Jul. 2, 1999

(51) Int. Cl.$^7$ .................................................. G01J 3/46
(52) U.S. Cl. ...................... 356/402; 356/402; 356/408; 356/414
(58) Field of Search .................... 356/402, 408, 356/414, 303, 320

(56) References Cited

U.S. PATENT DOCUMENTS

| | | | |
|---|---|---|---|
| 4,382,656 | 5/1983 | Gilby | 350/96.28 |
| 4,649,276 | 3/1987 | Suzuki | 250/261 R |
| 4,803,992 | 2/1989 | Lemelson | 128/634 |
| 4,833,326 | 5/1989 | Valenta et al. | 250/362 |
| 4,835,389 | 5/1989 | Doyle | 250/343 |
| 4,986,658 | 1/1991 | Kim | 356/318 |
| 5,028,769 | 7/1991 | Claypool et al. | 235/454 |
| 5,261,410 | 11/1993 | Alfano et al. | 128/664 |
| 5,306,901 | 4/1994 | Schechner et al. | 235/473 |
| 5,452,723 | 9/1995 | Wu et al. | 128/664 |
| 5,459,316 | 10/1995 | Doyle | 250/339.11 |
| 5,506,678 | 4/1996 | Carlsen et al. | 356/338 |
| 5,534,997 | 7/1996 | Schrader | 356/301 |
| 5,625,459 | 4/1997 | Driver | 356/446 |
| 5,657,404 | 8/1997 | Buchanan et al. | 385/12 |

Primary Examiner—Frank G. Font
Assistant Examiner—Reginald A. Ratliff
(74) Attorney, Agent, or Firm—Paul W. Martin

(57) ABSTRACT

A produce data collector with minimal spectral distortion. The produce data collector includes a light pipe having entrance and exit ends through which a portion of light reflected from a produce item travels, and a spectrometer adjacent the exit end of the light pipe which splits the portion of light into a plurality of wavelengths and which produces signals associated with the wavelengths for identifying the produce item.

17 Claims, 6 Drawing Sheets

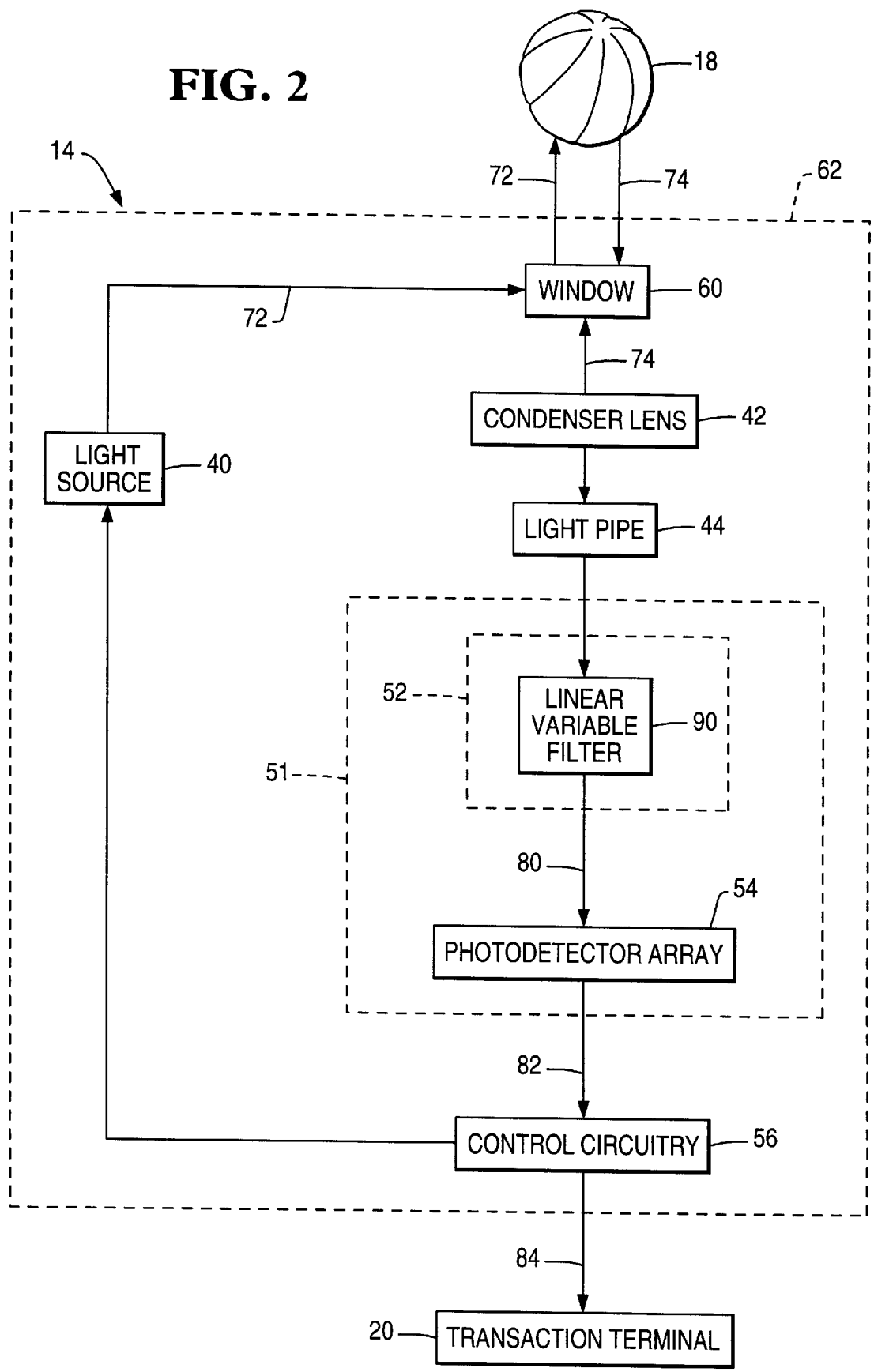

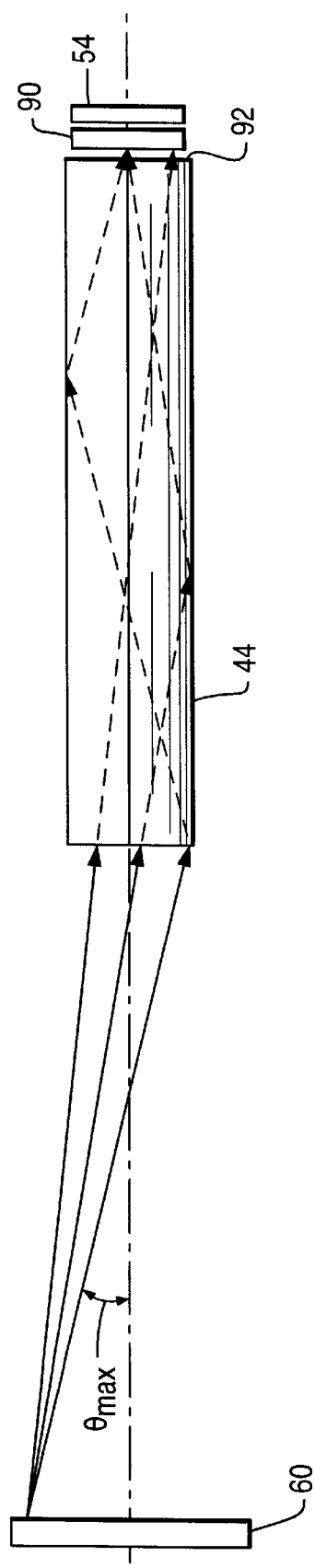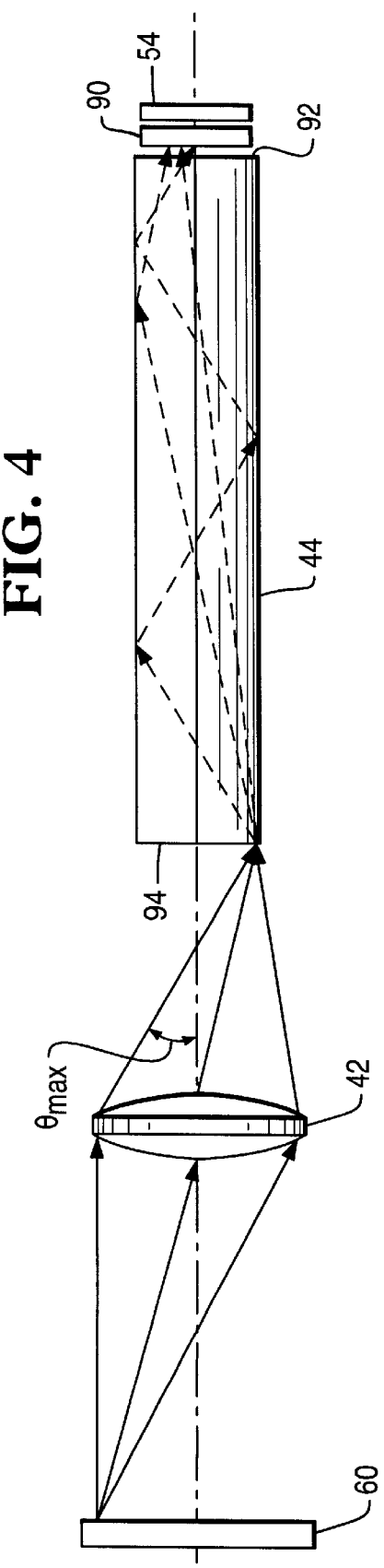

PRODUCE DATA COLLECTOR AND PRODUCE RECOGNITION SYSTEM

CROSS-REFERENCE TO RELATED APPLICATIONS

The present invention is related to the following commonly assigned and co-pending U.S. application:

"Produce Data Collector And Produce Recognition System", filed Nov. 10, 1998, invented by Gu, and having a Ser. No. 09/189,783.

BACKGROUND OF THE INVENTION

The present invention relates to product checkout devices and more specifically to a produce data collector and produce recognition system.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

Therefore, it would be desirable to provide a produce data collector and produce recognition system. It would also be desirable to provide a spectrometer-equipped produce data collector which operates with minimal spectral distortion.

SUMMARY OF THE INVENTION

In accordance with the teachings of the present invention, a produce data collector and produce recognition system are is provided.

The produce data collector includes a light pipe having entrance and exit ends through which a portion of light reflected from a produce item travels, and a spectrometer adjacent the exit end of the light pipe which splits the portion of light into a plurality of wavelengths and which produces signals associated with the wavelengths for identifying the produce item.

The light pipe may be a hollow light pipe or a light rod.

An example spectrometer includes a linear variable filter, and a photodetector array adjacent the linear variable filter.

The produce data collector may additionally include a lens adjacent an entrance end of the light pipe which focuses the portion of light at the entrance end of the light pipe.

It is accordingly an object of the present invention to provide a produce data collector and produce recognition system.

It is another object of the present invention to provide a produce data collector which includes a spectrometer and which operates with minimal spectral distortion.

It is another object of the present invention to provide a produce data collector which includes a linear variable filter and which operates with minimal spectral distortion.

It is another object of the present invention to provide a produce data collector with a reduced field-of- view effect.

It is another object of the present invention to provide a produce data collector which uses light pipe to minimize spectral distortion.

It is another object of the present invention to provide a produce data collector which uses light pipe to reduce the field-of-view effect and improve the light collection efficiency from a produce item to a linear variable filter without increasing the incident angle of light onto the linear variable filter.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a block diagram of a type of produce data collector which collects spectral data;

FIG. 3 is a first diagrammatic illustration of the operation of a light pipe within the produce data collector;

FIG. 4 is a second diagrammatic illustration of the operation of the light pipe with a condenser lens within the produce data collector;

DETAILED DESCRIPTION OF THE PREFERRED EMBODIMENT

Figure 1:
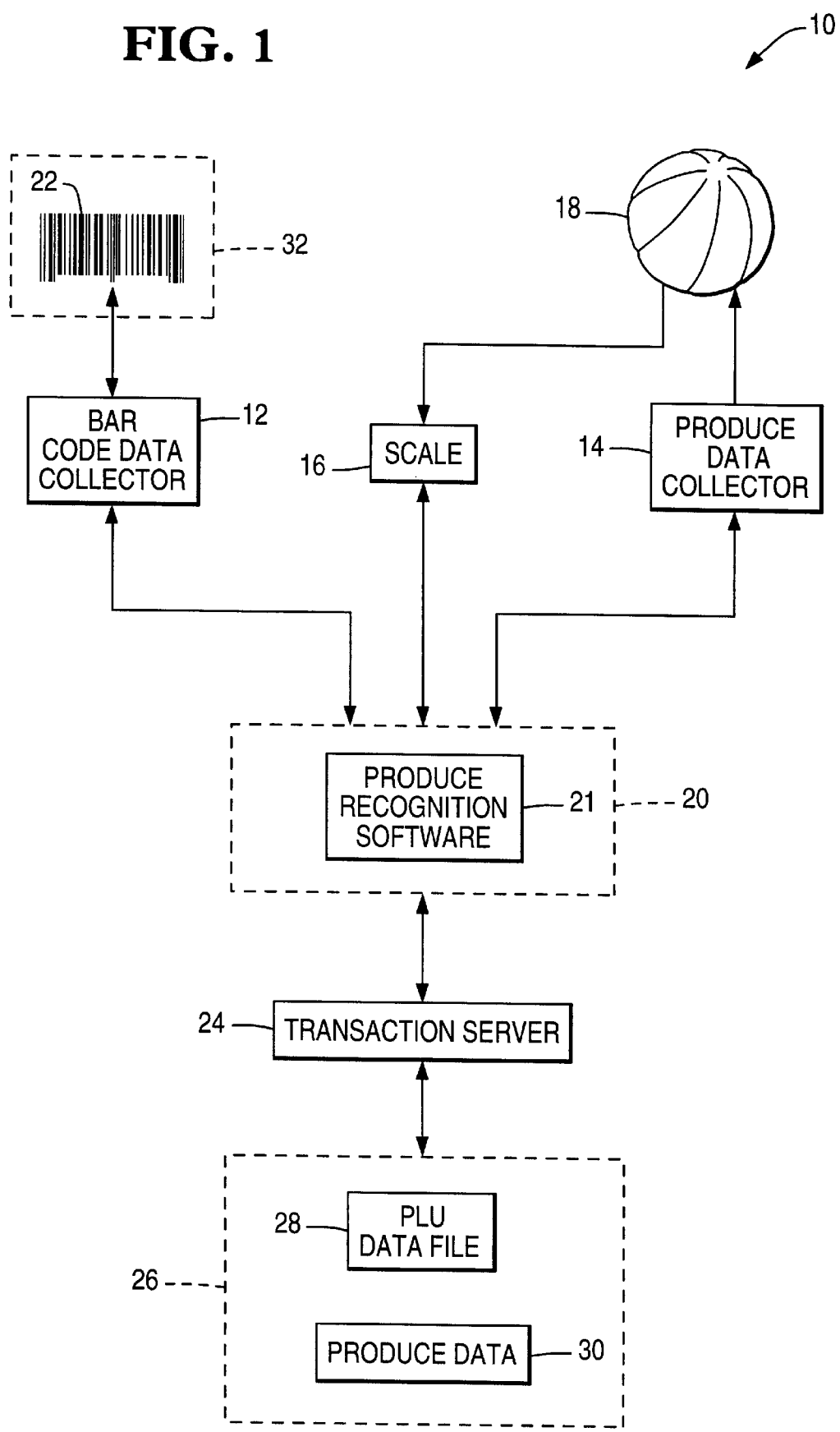
FIG. 1 is a block diagram of a transaction processing system including a produce recognition system.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-barcoded merchandise item. Such data preferably includes color and color distribution data, but may also include size data, shape data, surface texture data, and aromatic data. Reference produce data 30 is collected and stored.

During a transaction, operation of produce data collector 14 may be initiated by placement of produce item 18 on scale 16 or in by operator-initiated commands from transaction terminal 20.

Scale 16 determines a weight for produce item 18. Scale 16 works in connection with bar code data collector 12, but may be designed to operate and be mounted separately. Scale 16 sends weight information for produce item 18 to transaction terminal 20 so that transaction terminal 20 can determine a price for produce item 18 based upon the weight information.

Bar code data collector 12 and produce data collector 14 operate separately from each other, but may be integrated together. Bar code data collector 12 works in conjunction with transaction terminal 20 and transaction server 24.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce characteristics from produce data collector 14, identifies produce item 18 by comparing produce data in produce data 30 with collected produce data, retrieves an item identification number from produce data 30, retrieves a corresponding unit price from PLU data file 28 and calculates the total price of produce item 18 with the weight from scale 16.

In an alternative embodiment, identification of produce item 18 may be handled by transaction server 24. Transaction server 24 receives collected produce characteristics and compares them with produce data in produce data 30. Following identification, transaction server 24 obtains a price for produce item 18 and forwards it to transaction terminal 20.

Storage medium 26 preferably includes one or more hard disk drives. PLU data file 28 and produce data 30 are stored within storage medium 26, but either may also be located instead at transaction terminal 20, or bar code data collector 12.

To assist in proper identification of produce items, produce recognition software 21 may additionally display candidate produce items for operator verification. Produce recognition software 21 preferably arranges the candidate produce items in terms of probability of match and displays them as text and/or color images on an operator display of transaction terminal 20. The operator may accept the most likely candidate returned by or override it with a different choice.

Turning now to FIG. 2, produce data collector 14 primarily includes light source 40, optional condenser lens 42, light pipe 44, spectrometer 51, control circuitry 56, transparent window 60, and housing 62.

Light source 40 produces light 70. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED.

Other types of light sources 40 are also envisioned by the present invention, although they may be less advantageous than the broad spectrum white LED. For example, a tungsten-halogen light may be used because of its broad spectrum, but produces more heat.

A plurality of different-colored LEDs having different non-overlapping wavelength ranges may be employed, but may provide less than desirable collector performance if gaps exist in the overall spectral distribution.

Condenser lens 42 and light pipe 44 reduce spectral distortion by minimizing field-of-view (FOV) effect.

Spectrometer 51 includes light separating element 52 and photodetector array 54.

Light separating element 52 splits light 76 in the preferred embodiment into light 80 of a continuous band of wavelengths. Light separating element 52 is preferably a linear variable filter (LVF) 90, such as the one manufactured Optical Coating Laboratory, Inc. LVF 90 offers continuous spectral coverage within the visible wavelength range (400–700 nm). LVF 90 is preferably mounted on photodetectory array 54.

Photodetector array 54 produces waveform signals 82 containing spectral data. The pixels of the array spatially sample the continuous band of wavelengths produced by light separating element 52, and produce a set of discrete signal levels. Photodetector array 54 is preferably a complimentary metal oxide semiconductor (CMOS) array, but could be a Charge Coupled Device (CCD) array.

Control circuitry 56 controls operation of produce data collector 14 and produces digitized produce data waveform signals 84. For this purpose, control circuitry 56 includes an analog-to-digital (A/D) converter. A twelve bit A/D converter with a sampling rate of 22–44 kHz produces acceptable results.

Transparent window 60 may include an anti-reflective coating to reduce the reflection of light 72, which may add background light noise to light 74.

Housing 62 contains light source 40, condenser lens 42, light pipe 44, spectrometer 51, photodetector array 54, control circuitry 56, and transparent window 60.

In operation, an operator places produce item 18 on window 60. Control circuitry 56 turns on light source 40. Light separating element 52 separates reflected light 74 into different wavelengths to produce light 80 of a continuous band of wavelengths. Photodetector array 54 produces waveform signals 82 containing produce data. Control circuitry 56 produces digitized produce data signals 84 which it sends to transaction terminal 20. Control circuitry 56 turns off light source 40 and goes into a wait state.

Transaction terminal 20 uses produce data in digitized produce data signals 84 to identify produce item 18. Here, produce data consists of digitized waveforms which transaction terminal 20 compares to reference digitized waveforms stored within produce data 30. After identification, transaction terminal 20 obtains a unit price from PLU data file 28 and a weight from scale 16 in order to calculate a total cost of produce item 18. Transaction terminal 20 enters the total cost into the transaction.

With reference to FIGS. 3 and 4, an LVF-equipped spectrometer 51 is shown in more detail. One important characteristic of such an LVF-equipped spectrometer 51 is that the physical position along the length of LVF 90 corresponds to wavelengths. This characteristic results in a field-of-view (FOV) effect.

In simple terms, a window of finite size causes distortion in a measured waveform. This distortion is mainly caused by two factors: 1) the arrival of rays from one point on window 60 at different points on LVF 90 with different distances and incident angles (radiometric effect), and 2) the wavelength shift of the filtering band of LVF 90 for non-normal incident rays.

Such distortion could be very significant when the distance between window 60 and LVF 90 is small. However, for optimal efficiency and compactness, it would be desirable to place LVF 90 as close to window 60 as possible. To reduce the FOV effect, the distance between window 60 and LVF 90 must be many times larger than both the sizes of window 60 and LVF 90.

With reference to FIG. 3, the present invention reduces the FOV effect and hence improves the performance. The incident angles of all rays will not change when they travel through light pipe 44, but the position of rays with different incident angles from any given point at window 60 will be mixed at exit face 92 of light pipe 44. Making light pipe 44 longer improves mixing. Though the optical path traveled by light 74 is increased by light pipe 44, the length of light pipe 44 itself does not reduce efficiency. The physical dimensions of produce data collector 14 can be reduced by folding the optical path of light 74 by folding light pipe 44.

With reference to FIG. 4, light pipe 44 may be used with or without condenser lens 42. Condenser lens 42 improves efficiency by focusing light 74 at entrance surface 94 of light pipe 44, but increases the range of incident angles of light 74 onto the LVF. However, due to the mixing effect of light pipe 44, the FOV effect at exit face 92 of light pipe 44 is reduced to a pure smoothing effect on the spectrum. This is equivalent to a reduced spectral resolution of LVF 90. If the spectra from produce item 18 are smooth and continuous, a slightly lower wavelength resolution may still be adequate. The smoothing effect can be controlled by limiting the maximum incident angle $\theta_{max}$. For example, the maximum incident angle can be set to the acceptance angle of the light separating element 52, in which case the smoothing effect will be negligible.

In the embodiment of FIG. 3, maximum incident angle $\theta_{max}$ is limited by the acceptable minimum distance from window 60 to LVF 90 for a certain window size.

In the embodiment shown in FIG. 4, maximum incident angle $\theta_{max}$ is determined by the size of lens 42 and the distance from lens 42 to the entrance of light pipe 44.

Figure 5A:
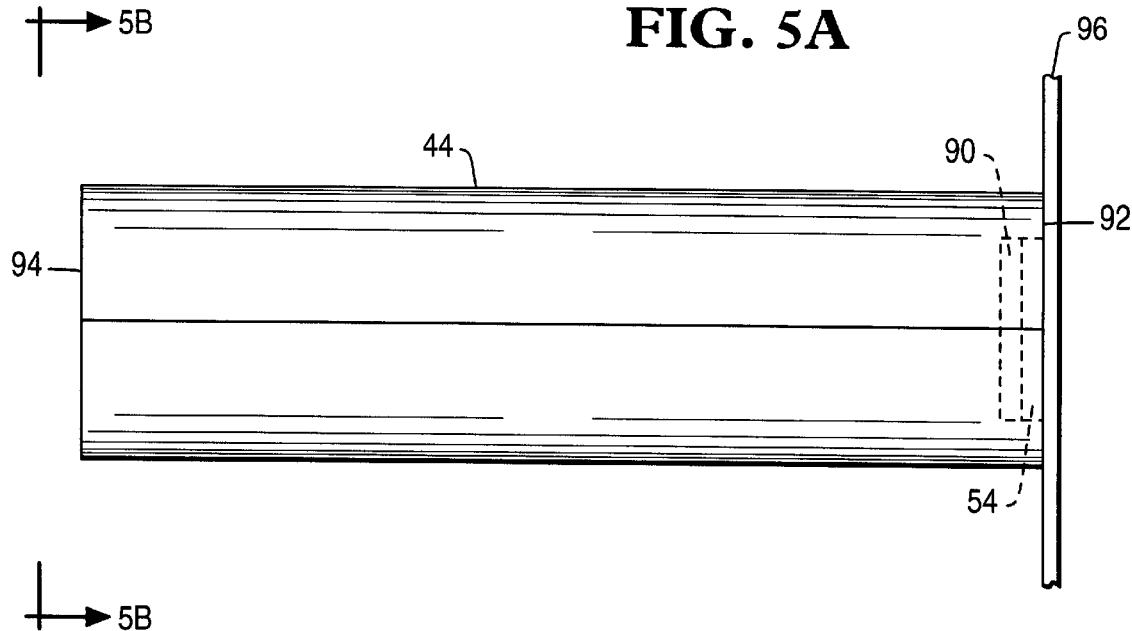
FIG. 5A is a side view illustrating the mounting of the light pipe with a spectrometer.
Figure 5B:
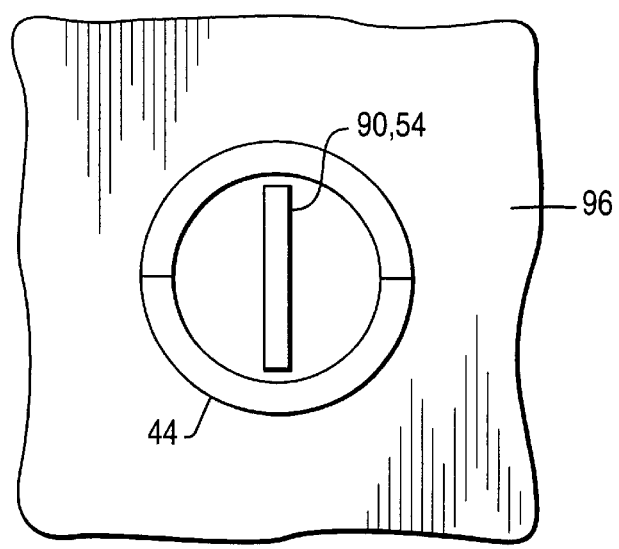
FIG. 5B is a front view illustrating the attachment of the light pipe with the spectrometer.
Figure 6:
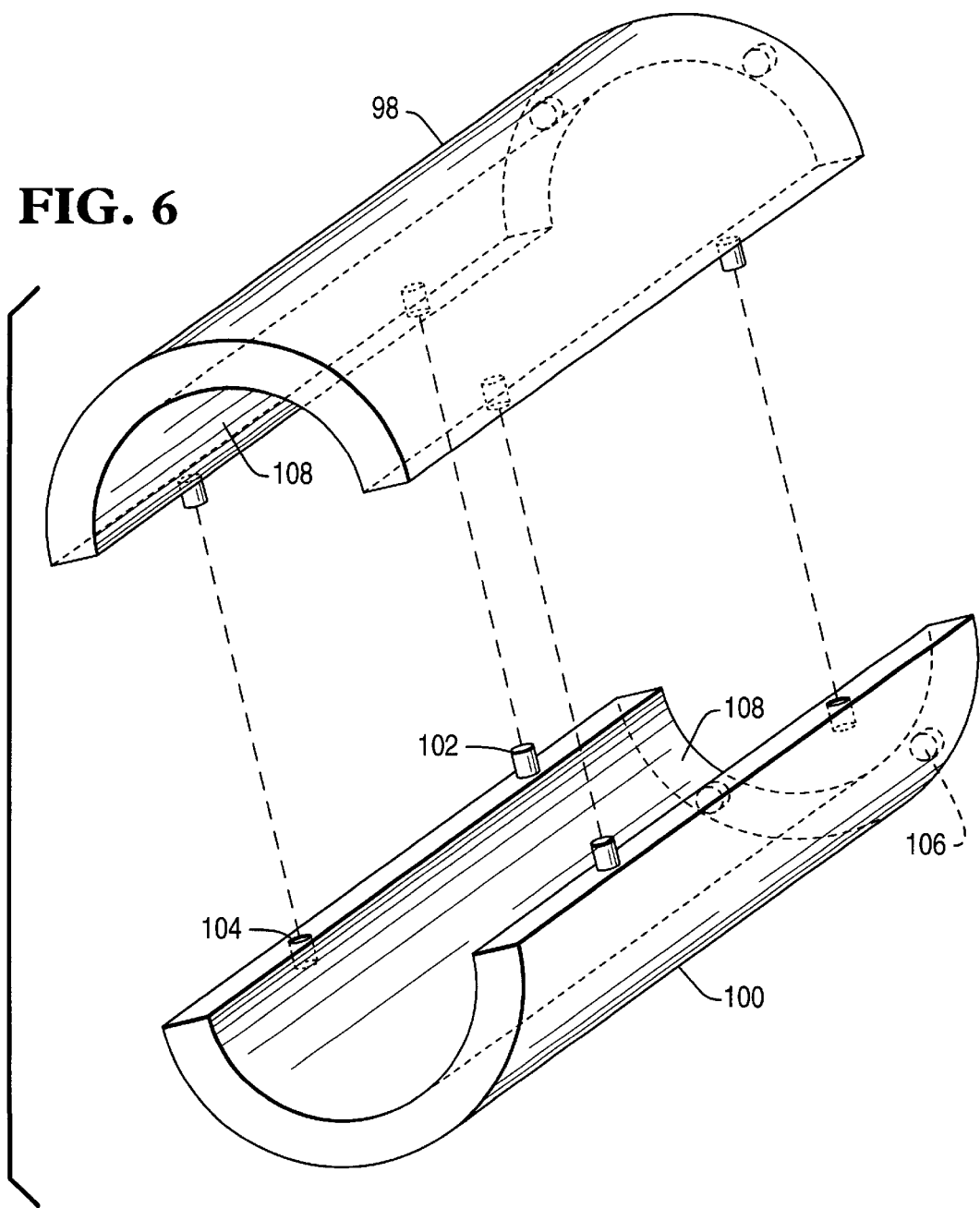
FIG. 6 is an exploded view of the light pipe.

A practical light pipe design for embodiments Of FIGS. 3 and 4 is illustrated in FIGS. 5A, 5B, and 6. With reference to FIGS. 5A and 5B, LVF 90, photodetector array 54, and light pipe 44 are mounted to printed circuit board 96.

With reference to FIG. 6, light pipe 44 is hollow and includes two halves 98 and 100. The inner surfaces of halves 98 and 100 are of optical quality and are highly reflective. The inner surfaces include a reflective coating 108, such as enhanced aluminum. The outer surfaces have no optical functional requirements. The seams where halves 98 and 100 join should be orientated perpendicular to the linear dimension of LVF 90 in order to minimally effect the accuracy of LVF 90.

Fabrication can be simple and cost-effective. Halves 98 and 100 can be formed from injection molding pr compression molding. Reflective coating 108 may be applied using evaporative coating techniques.

As shown in FIG. 6, the two halves can be the same mechanical part. Pins 102 and holes 104 are arranged diagonally. Adhesive can be used to keep halves 98 and 100 together. Screws may also be used to fasten halves 98 and 100 together. Snap-in features may be added to the halves 98 and 100 so that they can be snapped together. Each of halves 98 and 100 has holes 106, which may be threaded, for fastening light pipe 44 to printed circuit board 96.

Figure 7:
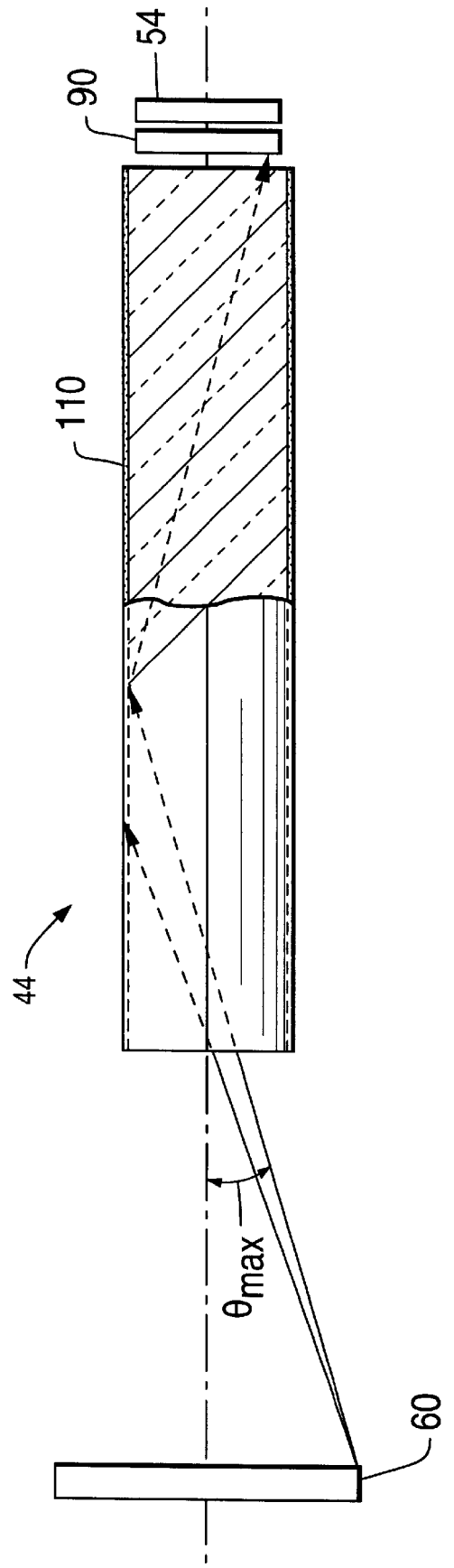
FIG. 7 is a third diagrammatic illustration of the operation of a light pipe within the produce data collector.

Referring now to FIG. 7, a third embodiment uses light pipe 44 itself to limit the maximum incident angle $\theta_{max}$ onto LVF 90. Since the acceptance angle of LVF 90 is usually less than twenty degrees, a polished glass cylinder or rod may be used as light pipe 44, utilizing its total internal reflection. In this embodiment, light pipe 44 is a light rod made of optical material with an index of refraction $n_1$, such as optical glass or optical plastic. The outer surface of the solid pipe is optically smooth and coated with a thin layer 110 of another material of slightly lower index of refraction $n_2$. When a light ray strikes the interface of the two materials it will undergo total internal reflection (TIR) if its angle is less than maximum incident angle $\theta_{max}$, where $\theta_{max}$ (in degrees) is given by $$\theta_{max} = 90 - \sin^{-1}\left(\frac{n_2}{n_1}\right).$$

All rays that have angles greater than $\theta_{max}$ will transmit through the interface and preferably be absorbed by the light absorbing material. In this embodiment, light pipe 44 can be positioned much closer to window 60 because light with large angles is filtered out by light pipe 44. Light collection efficiency is much higher.

For all three embodiments, the diameter of light pipe 44 should be slightly larger than the length of LVF 90. LVF 90 should be placed as close as possible to, optimally adjacent to, exit face 92.

Optimal length L of light pipe 44, is determined by three factors: 1) maximum incident angle $\theta_{max}$, 2) diameter D of light pipe 44, and 3) light pipe folding factor N:

$$(N-1)\frac{D}{L} = \tan\theta_{max}.$$

Light pipe folding factor N is a measure of mixing. If the ray with the largest incident angle is folded N-1 times in light pipe 44, the rays will be mixed approximately N times at exit face 92. For any given point on window 60, there are N rays with different incident angles that will be mixed at any given point on LVF 90. Without light pipe 44, there is no mixing; only one ray goes from a given point on window 60 to a given point on LVF 90. A light pipe folding factor greater than four significantly reduces the FOV effect.

The discussion above is also valid for skewed rays.

Although the invention has been described with particular reference to certain preferred embodiments thereof, variations and modifications of the present invention can be effected within the spirit and scope of the following claims.

What is claimed is:

1. A produce data collector comprising:
a light source for illuminating a produce item;
a light pipe having entrance and exit ends through which a portion of light reflected from the produce item travels; and
a spectrometer adjacent the exit end of the light pipe, including a linear variable filter which splits the portion of light into a plurality of wavelengths, and which produces signals associated with the wavelengths for identifying the produce item;
wherein the light pipe reduces spectral distortion in the wavelengths.

2. The produce data collector as recited in claim 1, wherein the spectrometer further comprises:
a photodetector array adjacent the linear variable filter.

3. The produce data collector as recited in claim 1, wherein the light pipe comprises a hollow cylinder.

4. The produce data collector as recited in claim 3, wherein the light pipe has an inner surface and further comprises a reflective layer on the inner surface.

5. The produce data collector as recited in claim 1, wherein the light pipe comprises a light rod.

6. The produce data collector as recited in claim 5, wherein the light pipe has an index of refraction and an outer surface, and wherein the light pipe further comprises a layer of material having an index of refraction which is lower than the index of refraction of the light pipe.

7. The produce data collector as recited in claim 1, further comprising:
   a lens adjacent the entrance end of the light pipe which focuses the portion of light at the entrance end of the light pipe.

8. The produce data collector as recited in claim 1, further comprising:
   control circuitry which controls the light source and which converts the signals to digital signals.

9. A produce data collector comprising:
   a light source for illuminating a produce item through a window adjacent to the produce item;
   a hollow light pipe, having entrance and exit ends and an inner surface, through which a portion of light reflected from the produce item travels;
   a reflective layer on the inner surface;
   a linear variable filter adjacent the exit end of the light pipe which splits the portion of light into a plurality of wavelengths; and
   a photodetector array adjacent the linear variable filter which produces signals associated with the wavelengths for identifying the produce item;
   wherein the light pipe reduces spectral distortion in the wavelengths.

10. The produce data collector as recited in claim 9, further comprising:
    a lens adjacent the entrance end of the light pipe which focuses the portion of light at the entrance end of the light pipe.

11. A produce data collector comprising:
    a light source for illuminating a produce item;
    a light pipe including a transparent rod, having entrance and exit ends and an outer surface, through which a portion of light reflected from the produce item travels, wherein the light rod has an index of refraction;
    a layer of material on the outer surface of the light pipe which has an index of refraction which is lower than the index of refraction of the light pipe;
    a linear variable filter adjacent the exit end of the light pipe which splits the portion of light into a plurality of wavelengths; and
    a photodetector array adjacent the linear variable filter which produces signals associated with the wavelengths for identifying the produce item;
    wherein the light pipe reduces spectral distortion in the wavelengths.

12. A produce recognition system comprising:
    a produce data collector comprising:
      a light source for illuminating a produce item;
      a light pipe having entrance and exit ends through which a portion of light reflected from the produce item travels; and
      a spectrometer adjacent the exit end of the light pipe which splits the portion of light into a plurality of wavelengths and which produces signals associated with the wavelengths for identifying the produce item;
      wherein the light pipe reduces spectral distortion in the wavelengths;
    control circuitry which converts the signals to a spectrum of digital signals; and
    a computer which compares the spectrum of digital signals to reference spectra to identify the produce item.

13. The produce recognition system as recited in claim 12, wherein the produce data collector further comprises:
    a lens adjacent the entrance end of the light pipe which focuses the portion of light at the entrance end of the light pipe.

14. A method of collecting produce data from a produce item comprising the steps of:
    illuminating the produce item;
    mixing a portion of light reflected from the produce item to reduce field of view effect;
    splitting the portion of light into a plurality of wavelengths by a linear variable filter; and
    producing signals associated with the wavelengths for identifying the produce item.

15. A method of collecting produce data from a produce item comprising the steps of:
    illuminating the produce item;
    mixing a portion of light reflected from the produce item by a light pipe to reduce field of view effect;
    splitting the portion of light into a plurality of wavelengths by a linear variable filter adjacent an exit of the light pipe; and
    producing signals associated with the wavelengths for identifying the produce item by a photodetector array.

16. The method as recited in claim 15, further comprising the step of:
    focusing the reflected light at the entrance of the light pipe.

17. A produce recognition method comprising the steps of:
    illuminating the produce item;
    mixing light of different angles reflected from the produce item by a light pipe to reduce field of view effect;
    splitting the portion of light into a plurality of wavelengths by a linear variable filter adjacent an exit of the light pipe;
    producing signals associated with the wavelengths for identifying the produce item by a photodetector array;
    converting the signals to a spectrum of digital signals; and
    comparing the spectrum of digital signals to reference spectra to identify the produce item.

* * * * *